April 4, 1944.  J. H. PRESSLEY  2,345,684
CONTROL MECHANISM FOR AUTOMATIC PHONOGRAPHS
Filed Oct. 9, 1941
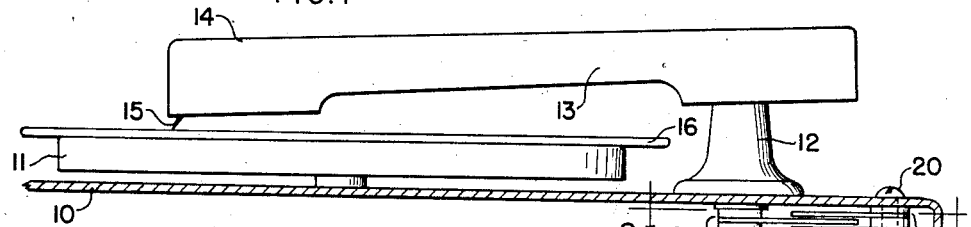
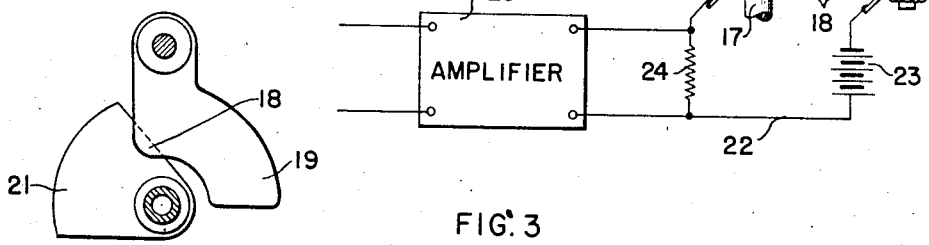
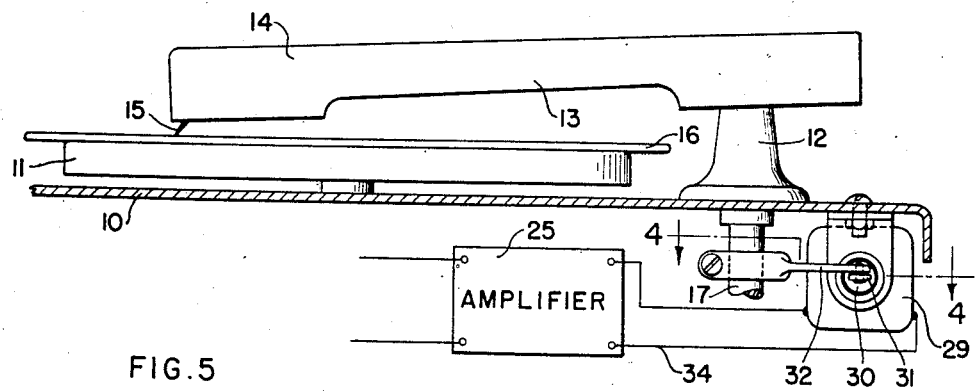
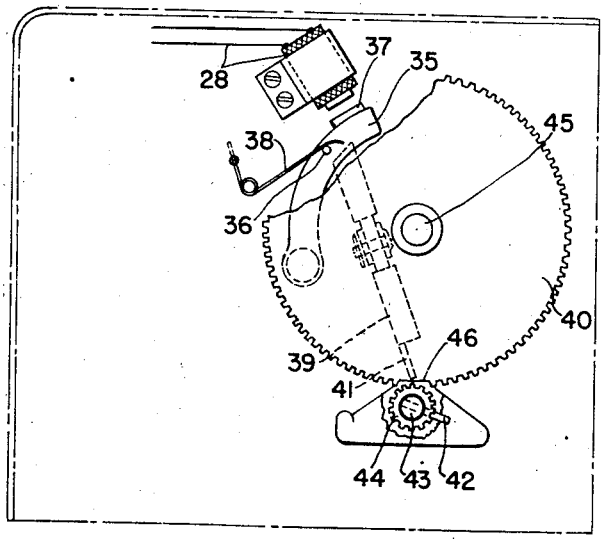
INVENTOR
JACKSON H. PRESSLEY
BY
ATTORNEY Patented Apr. 4, 1944

2,345,684

UNITED STATES PATENT OFFICE 2,345,684

CONTROL MECHANISM FOR AUTOMATIC PHONOGRAPHS

Jackson Hard Pressley, Marion, Ind., assignor to Farnsworth Television and Radio Corporation, a corporation of Delaware Application October 9, 1941, Serial No. 414,242

5 Claims. (Cl. 192—118)

This invention relates to control mechanism for automatic phonographs and more particularly to that type of control mechanism adapted to be actuated by the variation of the speed of movement of the pickup arm.

According to conventional automatic phonograph apparatus, the control mechanism is actuated by a mechanical movement of levers or by a mechanical closing of an electric circuit. The mechanical movement of levers is brought about either as a result of the pickup arm reaching a predetermined position from the center of the turntable or by an abnormal movement of the pickup arm when it reaches the tripping groove of a record on the turntable.

The object of the invention is to provide an improved and simplified control mechanism adapted to initiate the operation of a driving mechanism in an automatic phonograph.

Another object of the invention is to provide a control mechanism which will generate a signal as a result of the abnormal movement of the pickup arm when it reaches a tripping groove of a record on the turntable.

Another object of the invention is to provide a control mechanism which will regulate a signal in response to the abnormal movement of a pickup arm for initiating the operation of a driving mechanism.

Another object of the invention is to provide a control mechanism with a minimum number of parts so that it may be easily embodied in all types of automatic phonographs.

In accordance with the present invention, there is provided in an automatic phonograph, including a pickup arm adapted to be moved at a first predetermined speed as it follows a playing groove of a record and to be moved at a second different speed as it follows a tripping groove of a record and driving means, a control mechanism comprising a tripping mechanism for controlling the operation of the driving means, means responsive to an electric control signal for actuating the tripping mechanism, means operably connected with the pickup arm and responsive to movement thereof at the second different speed for developing the control signal, and means for applying said control signal to said actuating means.

For a better understanding of the invention, together with other and further objects thereof, reference is made to the following description taken in connection with the accompanying drawing and its scope will be pointed out in the appended claims.

In the accompanying drawing:

Fig. 1 is a side view showing one form of the control mechanism;

Fig. 2 is a detail view along line 2—2 of Fig. 1;

Fig. 3 is a side view showing another form of the control mechanism shown in Fig. 1;

Fig. 4 is a sectional view along lines 4—4 of Fig. 3; and

Fig. 5 is a plan view of the tripping mechanism adapted to be operated by the control mechanisms shown in Figs. 1 and 3.

Referring now more particularly to Figs. 1 and 3, the apparatus illustrated includes a base plate 10, to which a turntable 11 is rotatably connected in a suitable manner. At one side of the turntable 11, there is affixed to the base plate 10 in a suitable manner a pedestal 12 which is adapted pivotally to support at its upper end a pickup arm 13. At the free end of the pickup arm 13, there is provided a reproducer 14 with a stylus 15. When the stylus 15 is tracking a playing groove of a disc record 16 on the turntable 11, the pickup arm 13 is adapted to move at a predetermined speed toward the center of the turntable. When the stylus 15 is tracking a tripping groove of a record 16, it is adapted to move the pickup arm 13 at more than the predetermined speed toward the center of turntable 11. Fixed to the pivotal end of the pickup arm 13, there is a shaft 17 which extends downwardly through the pedestal 12 and is adapted to rotate as the pickup arm 13 moves radially across the turntable 11.

One form of control mechanism adapted to be operated with the pickup arm 13 is illustrated in Fig. 1. It includes a condenser 18, which comprises a set of fixed plates 19 connected to the bottom of the base plate 10 in a suitable manner, preferably by a bolt 20, and a set of movable plates 21 connected to the lower end of the shaft 17 to move therewith. The two sets of plates 19 and 21 are so related to each other that the plates 21 may be moved between the plates 19, as is readily seen in Fig. 1. When the pickup arm 13 is in the initial playing groove of a record on the turntable 11, the sets of plates 19 and 21 are in the positions shown in Fig. 2. When the pickup arm 13 moves at a predetermined speed toward the center of the turntable 11, the plates 21 move in a clockwise direction at a corresponding speed. When the pickup arm 13 moves at a greater than predetermined speed toward the center of the turntable 11, the plates 21 move in a clockwise direction at a correspondingly greater speed.

The two sets of condenser plates 19 and 21 are connected in an electric circuit 22 which also includes a source of potential 23, and a resistance 24. The signal in the circuit 22 is amplified by a suitable amplifier 25. The amplified signal is used to control the operation of an electro-magnet 28. The electro-magnet 28 is fixed to the bottom of the base plate 10 in a suitable manner, as shown in Fig. 5.

According to the equation, $EC=Q$, disregarding the resistance 24, the electric charge on the condenser 18 varies directly as its potential and its capacity. It is also true that when the capacity of the condenser 18 is changed in a unit of time, the electric charge of the condenser 18 is changed proportionately in the same unit of time. This relationship is expressed in the following equation:

$$E\frac{dc}{dt}=\frac{dQ}{dt}$$

Since the change of electric charge per unit of time is equal to the current, the above equation may also be expressed as follows:

$$i=E\frac{dc}{dt}$$

Thus, it is seen that the current flowing in electric circuit 22 may be controlled by the rate of change of the capacity in the condenser 18, which is brought about by changing the speed of movement of the pickup arm 13. Now, if the resistance 24 is reintroduced into the circuit 22, it is seen that any change in the current flowing in the resistance 24 will produce a proportionate change in the potential drop across the resistance 24. Thus, the change of the speed of the pickup arm 13 has the same proportional effect on the potential drop across the resistance 24 as it has on the current flowing in the circuit 22.

The change imparted to the signal in circuit 22 is utilized to initiate the operation of a tripping mechanism, which will be described hereafter.

Another form of control mechanism is shown in Fig. 3 of the drawing. It includes a solenoid 29 which is supported from the bottom of the base plate 10 in some suitable manner, as shown in Fig. 3. A small permanent magnet 30, one end of which is pivotally connected to a lever 31, is adapted to be moved in and out of the solenoid 29 in response to the movement of the pickup arm 13 toward and away from the center of the turntable. The other end of the lever 31 is swivelly connected to a lever 32, as shown in Fig. 4. The opposite end of the lever 32 is fixed to the shaft 17, preferably as shown in Figs. 3 and 4. The magnet 30 is associated with the solenoid 29 and the shaft 17 in such a manner that when the stylus of the pickup arm 13 is in the initial playing groove of the record on the turntable 11, the magnet 30 is in the position shown in Fig. 4. When the pickup arm 13 is moved toward the center of the turntable at a predetermined speed, the magnet 30 is moved into the solenoid 29 at a corresponding speed. When the pickup arm 13 is moved toward the center of the turntable 11 at a greater than predetermined speed, the magnet is moved into solenoid 29 at a correspondingly greater speed. The voltage induced in the solenoid 29 varies directly with the speed with which the magnet 30 is moved into the solenoid 29 and with the speed with which the pickup arm 13 is moved.

The solenoid 29 is included in an electric circuit 34 which also includes an amplifier which serves the same function as the amplifier 25 in the control mechanism described above and will be referred to by the same number. As has been explained above, the amplified signal from the amplifier 25 is fed to the electro-magnet 28 to control its operation.

While only two forms of control mechanism have been illustrated and described, it is understood that any electrical control mechanism is suitable to initiate the tripping mechanism to be described hereafter, which is responsive to the variation of the speed of an element such as the pickup arm 13.

The tripping mechanism, which is adapted to be initiated by a signal of predetermined value from the control mechanism described above, includes the electro-magnet 28, previously mentioned. A curved-lever 35 is pivotally connected to the bottom of the base plate 10, preferably as shown in Fig. 5. Provided near the free end of the lever 35 is a projection 36 and an armature 37. A spring 38, connected in a suitable manner to the base plate 10, is adapted to engage the projection 36 and maintain the lever 35 in the position shown in Fig. 5. The electro-magnet 28 and the armature 37 are so related that when sufficient current flows into the electro-magnet 28, it attracts the armature 37 and moves the lever 35 against the biasing action of the spring 38. When the electro-magnet 28 is no longer energized, the tension in the spring 38 moves the lever 35 back to the position shown in Fig. 5. When the lever 35 is in the position shown in Fig. 5, it is adapted to engage one end of a pivotal lever 39. When the electro-magnet 28 attracts the lever 35 into engagement therewith, it also moves the lever 35 out of engagement with the lever 39. Intermediate its ends, the lever 39 is pivotally connected to a cam wheel 40, as shown in Fig. 5. The opposite end of the lever 39 has a projection 41 which is adapted to move into the path of a projection 42 when the lever 39 is released by the lever 35. The projection 42 is rotatably connected to a continuously rotating shaft 43. The shaft 43 has affixed thereto a pinion 44 which is adapted to drive the cam wheel 40. The cam wheel 40 is mounted to rotate on a shaft 45 extending downwardly from the base plate 10. The cam wheel may serve any suitable function, as, for example, moving records to a turntable and moving a stylus of a pickup arm into and out of engagement with a record on a turntable. These last-mentioned functions are performed by the cam wheel 62 of U. S. Patent No. 2,012,185. The periphery of the cam wheel 40 has a mutilated portion 46 which is adapted to break the driving relationship between the cam wheel 40 and the pinion 44 when it is moved opposite the periphery of the pinion 44.

The general mode of operation of the apparatus will now be described. After a record is placed on the turntable 11 and the stylus 15 in the reproducer 14 of the pickup arm 13 is brought into engagement with the initial playing groove of the record on the turntable, the rotation of the turntable is initiated. While the stylus 15 is tracking the playing groove of the record on the turntable, the pickup arm 13 is moving toward the center of the turntable 11 at a predetermined speed. When the stylus 15 moves into the tripping groove of the record on the turntable 11, the pickup arm moves toward the center of the record at a greater than predetermined speed. The movement of the pickup arm 13 at a predetermined speed toward the center of the turntable moves the condenser plates 21 or the magnet 30 at a corresponding speed. The movement of the condenser plates 21 or the magnet 30 in response to the movement of the pickup arm at a predetermined speed does not have a sufficient effect on the electric circuit 22 or the electric circuit 34, respectively, to permit a sufficient current to flow in the electro-magnet 28 to attract the armature 37. However, the movement of the condenser plates 21 or the magnet 30, in response to the movement of the pickup arm 13 at a greater than predetermined speed, has a sufficiently great effect on the electric circuit 22 or the electric circuit 34, respectively, to cause sufficient current to flow in the electro-magnet 28 to attract the armature 37. The attraction of the armature 37 by the electro-magnet 28 moves the lever 35 out of engagement with the lever 39. The disengagement of the lever 39 by the lever 35 permits the projection 41 of the lever 39 to move into the path of the projection 42. When the projection 42 engages the projection 41, the lever 39 and the cam wheel 40 are moved in a horizontal plane relative to the pinion 44 sufficiently far to bring the cam wheel 40 into driving engagement with the pinion 44. Thereafter, the cam wheel 40 is driven through one revolution, after which it is brought out of engagement with the pinion 44 by the mutilated portion 46. As has been mentioned previously, the cam wheel 40, during its single revolution, may be adapted to serve the same function as the cam wheel 62 of U. S. Patent No. 2,012,185, that is, to move a record to a turntable and move the stylus of a pickup arm out of and into engagement with a record on the turntable. During the movement of the cam wheel 40, the lever 35 engages the lever 39 so that the tripping mechanism may again be initiated by the control mechanism.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In an automatic phonograph including driving means and a pickup arm adapted to be moved at a first predetermined speed as it follows a playing groove of a record and to be moved at a second different speed as it follows a tripping groove of a record, the combination of a tripping mechanism for controlling the operation of said driving means; means responsive to an electric control signal for actuating said tripping mechanism; means, including a capacitance device having a fixed element and a movable element operably connected with said pickup arm to be moved thereby, for developing said control signal in response to the movement of said pickup arm at said second speed; and means for applying said control signal to said actuating means.

2. In an automatic phonograph including driving means and a pickup arm adapted to be moved at a first predetermined speed as it follows a playing groove of a record and to be moved at a second different speed as it follows a tripping groove of a record, the combination of a tripping mechanism for controlling the operation of said driving means; means responsive to an electric control signal for actuating said tripping mechanism; an electric circuit connected to said last-mentioned means; a resistance, a source of potential and a capacitance device connected in series in said circuit, said capacitance device having a fixed member and a movable element operably connected with said pickup arm to be moved thereby and being adapted to develop said control signal in response to the movement of said pickup arm at said second speed; and means for applying said control signal to said actuating means.

3. In an automatic phonograph, the combination of a pickup arm movable over a record, driving means adapted to be actuated by an electric control signal, means for applying said control signal to said driving means, and a capacitance device operably associated with said signal-applying means and having movable means operably connected with said pickup arm for being moved thereby to develop said control signal in response to a change in the rate of movement of said pickup arm whereby said driving means is actuated.

4. In an automatic phonograph, a pickup arm movable at a relatively slow speed as it follows a playing groove of a record and at a relatively fast speed as it follows the tripping groove of a record, said pickup arm being mounted for pivotal movement on a shaft adapted to rotate with said pickup arm, a variable condenser having a set of stator plates mounted stationary with respect to said shaft and a set of rotor plates mounted on said shaft for movement therewith, an electrical circuit including a series arrangement of said condenser, a source of potential and a resistor, said circuit functioning to develop voltages in said resistor representative of said two speeds of pickup arm movement, a tripping mechanism, and means controlled by the voltage developed in said resistor representative of said fast pickup arm movement for actuating said tripping mechanism.

5. In an automatic phonograph, a pickup arm movable at a relatively slow speed as it follows a playing groove of a record and at a relatively fast speed as it follows the tripping groove of a record, said pickup arm being mounted for pivotal movement on a shaft adapted to rotate with said pickup arm, a variable condenser having a set of stator plates mounted stationary with respect to said shaft, and a set of rotor plates mounted on said shaft for movement therewith, whereby to vary the capacity of said condenser at a rate in accordance with the speed of said pickup arm movement, an electrical circuit including a series arrangement of said condenser, a source of potential and a resistor, said circuit functioning to supply charging current to said condenser at two different values, whereby to develop two different voltages in said resistor representative of said two speeds of pickup arm movement, a tripping mechanism, and means controlled by the voltage developed in said resistor representative of said fast pickup arm movement for actuating said tripping mechanism.

JACKSON HARD PRESSLEY.